United States Patent [19]

Maeda et al.

[11] Patent Number: 4,863,488
[45] Date of Patent: Sep. 5, 1989

[54] SOLID FUELS

[75] Inventors: Sadahiko Maeda; Shinjiro Yokota; Yasumasa Idei, all of Yamaguchi, Japan

[73] Assignee: Ube Industries, Ltd., Yamaguchi, Japan

[21] Appl. No.: 62,149

[22] Filed: Jun. 12, 1987

[30] Foreign Application Priority Data

Jun. 13, 1986 [JP] Japan ................................ 61-136275
Nov. 14, 1986 [JP] Japan ................................ 61-269860

[51] Int. Cl.$^4$ ............................ C10L 5/06; C10L 5/00
[52] U.S. Cl. ......................................... 44/589; 44/506; 44/628
[58] Field of Search ................. 44/1 A, 1 D, 628, 589, 44/605

[56] References Cited

U.S. PATENT DOCUMENTS 3,852,046 12/1974 Brown .................................. 44/1 D
4,272,322  6/1981 Kobayashi ............................ 44/1 D
4,356,000 10/1982 Chappell .............................. 44/1 D
4,589,887  5/1986 Aunsholt .............................. 44/1 A

FOREIGN PATENT DOCUMENTS 23689    2/1982  Japan .................................... 44/1 D
140297   8/1984  Japan .................................... 44/1 D
217796  12/1984  Japan .................................... 44/1 D
26092    2/1985  Japan .................................... 44/1 D
1053393  3/1986  Japan .................................... 44/1 D
1101596  5/1986  Japan .................................... 44/1 D
2061241  5/1981  United Kingdom ................. 44/1 D Primary Examiner—Carl F. Dees

[57] ABSTRACT

A solid fuel obtained by mixing highly combustible, fusible materials such as polymer resin, and low calory powder such as fuel combustion ashes containing unburnt carbon components and inorganic component, and molding the mixture. The solid fuel has a controlled calorific value and a controlled combustion rate with a good shape retention.

6 Claims, 2 Drawing Sheets

SOLID FUELS

BACKGROUND OF THE INVENTION

1. Field of the Invention

This invention relates to solid fuels in the form of compression moldings which comprise plastics and powders of a low calorific value whereby fusible materials such as waste plastics, low calory powder such as coal combustion ashes, ashes obtained by combustion of oil cokes, ashes obtained from combustion of heavy oils, residues obtained after squeezing of food materials and the like are re-utilized as fuel resources.

2. Related Art Statement

In recent years, a huge amount of plastic articles have been in use, which is in turn accompanied by a great amount of waste plastics. In these waste plastics, there are contained a number of combustible plastics. If these are burnt as they are, the combustion rate becomes too high or the calorific value becomes too large, so that the combustion temperature reaches too high a level. This leads to the disadvantage that walls of a combustion boiler or furnace deteriorate within a short time because of the high temperature or that during the combustion the plastics melt and deposit on the walls of the combustion boiler or the plastic melt flows to impede the combustion, thus these plastics being unlikely to be used as a fuel.

On the other hand, combustion ashes of coal or heavy oil discharged, for example, from steam powder plants, or combustion ashes of oil cokes discharged from oil cokes combustion boilers are huge in amount. In general, these ashes are combusted after mixing with fuels of cement kilns or with oils, but since they are unlikely to burn, it is usual to permit them to store on field in huge amounts.

SUMMARY OF THE INVENTION

We made intensive studies to solve the various existing problems at the same time, which will be produced when each of waste plastics, combustion ashes of oil cokes, heavy oils and coal are used as fuels. As a result, it was found that a solid fuel in the form of pellets, which are obtained by mixing ashes obtained by ordinary combustion of coal, oil coke or heavy oil, with plastics, and subjecting the resulting mixture to compression molding, could solve the above problems and was suitable as a fuel. The present invention is accomplished based on the above finding.

In short, the present invention relates to a solid fuel consisting of compression moldings of a combustible, thermally fusible material and a low calory powder containing from 5 to 95 wt % of an inorganic component and from 95 to 10 wt % of a carbon component.

DETAILED DESCRIPTION OF THE INVENTION

Figure 1:
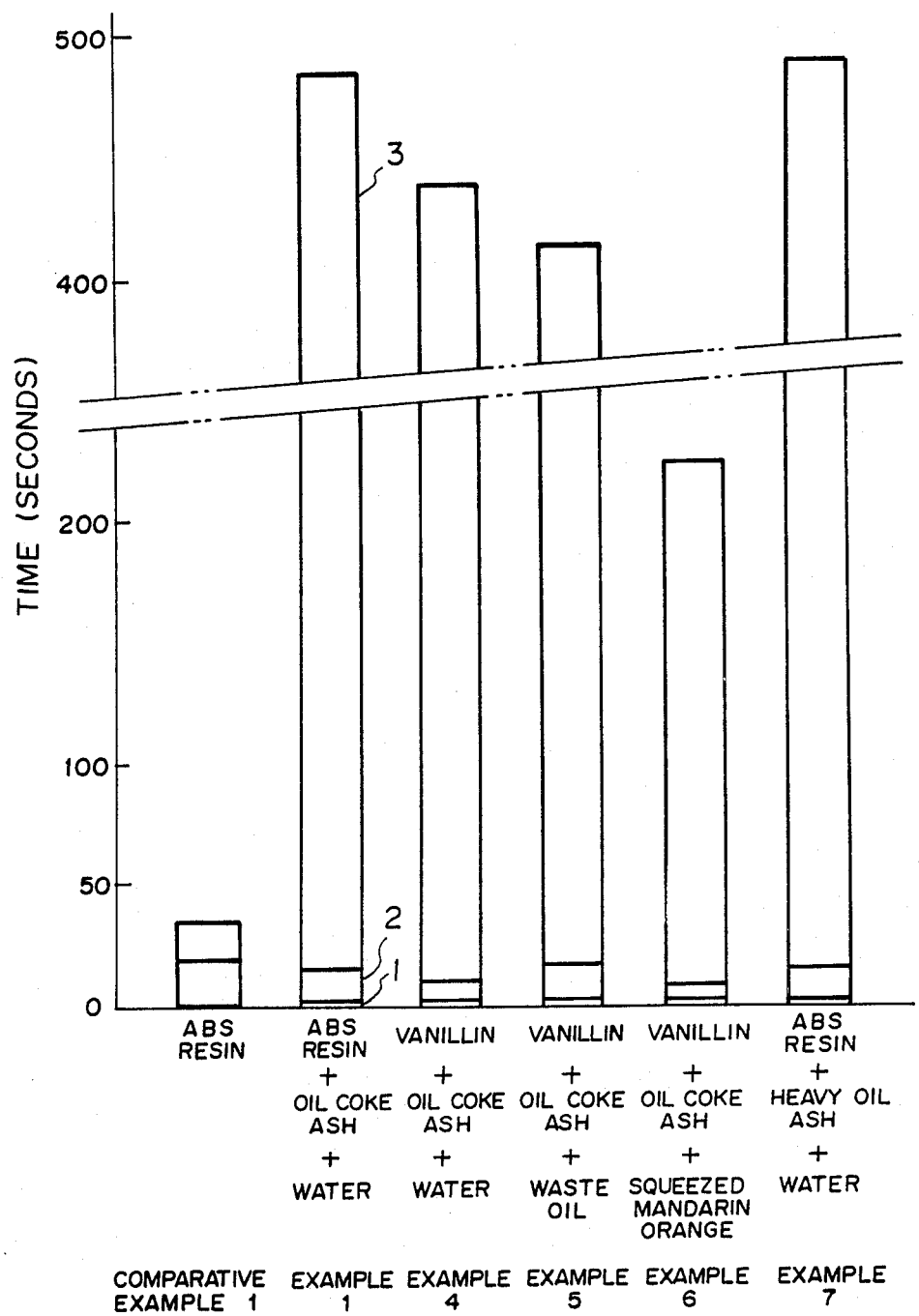
FIGS. 1 and 2 are, respectively, a bar graph showing the content of a combustion time in a combustion test of solid fuels according to the invention and ABS resin pellets for comparison.
Figure 2:
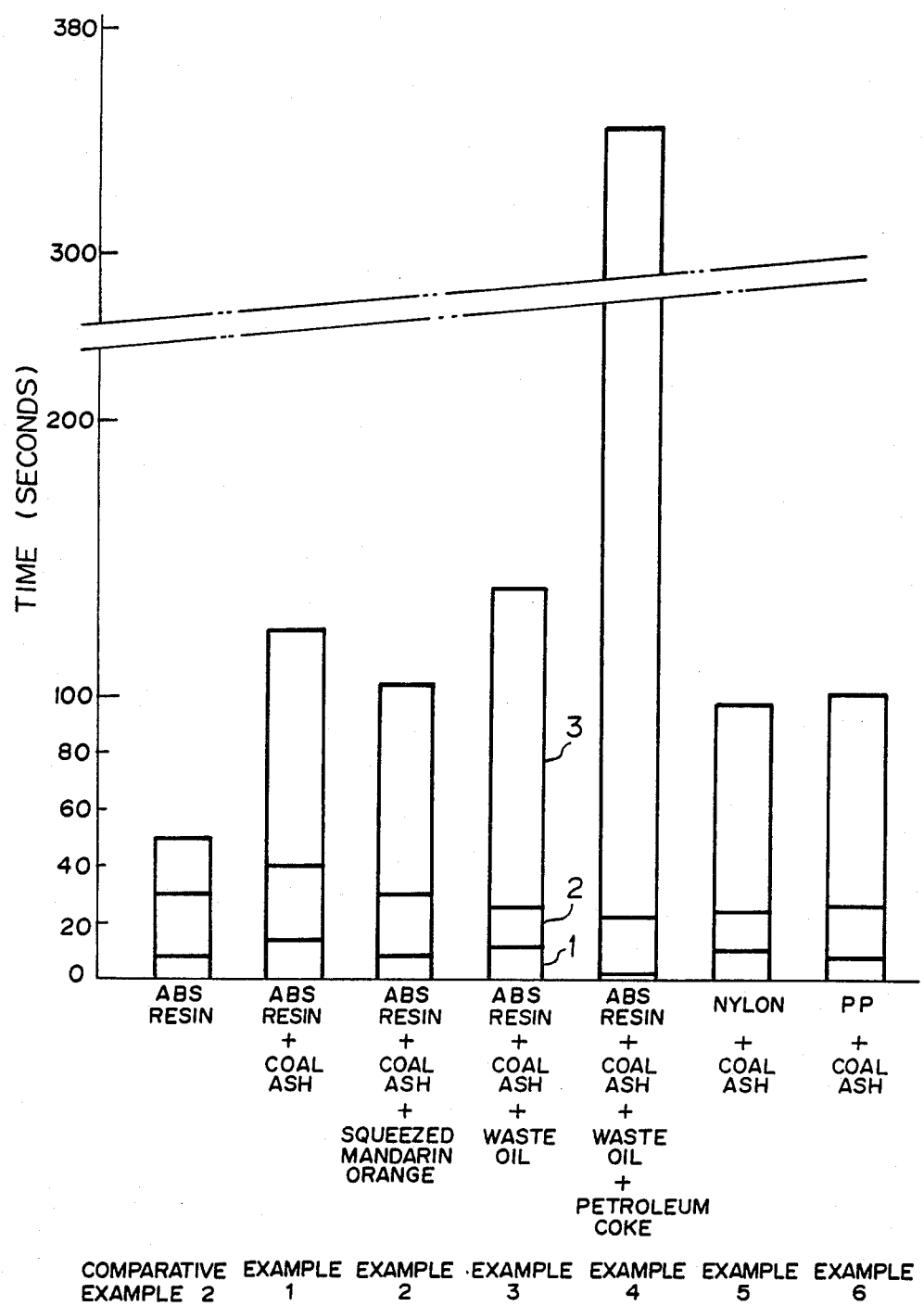

The plastic resin, which is one of combustible thermally-fusible substances used in the present invention, is not critical but should preferably be ones which have a high combustion rate and do not produce toxic substances in large amounts when combustion. Such plastic resins are, for example, one or more thermoplastic resins selected from the following resins:

(a) acrylic resins such as acrylonitrilebutadiene-styrene copolymers (ABS resins), acrylonitrilestyrene copolymers (AS resins), poly(meth)acrylic acid (esters) and the like;

(b) olefin polymers such as polypropylene, polyethylene, polyisobutylene, ethylene-vinyl acetate copolymers, and the like, and ethylene type polymers such as polystyrene;

(c) synthetic rubbers such as polybutadiene, polyisoprene, butadiene-styrene copolymers and the like, and natural rubbers; and (d) condensation polymers such as polyacetals, polyesters, polyamides (nylon-6, nylon-6,6, etc.) and the like.

The plastic resins used to mold the solid fuel of the invention may be waste plastics which are disused after temporary or long-term use of various plastic moldings, and off-quality moldings produced at the time of molding of various plastics, flashes, cut residues or salvages. In order to ensure uniform mixing the plastic with combustion ashes and appropriate compression molding of the mixture, the plastic is preferably ground to pieces, crushed, cut or torn to obtain a cut or crushed powder having a suitable size or shape. The plastics used for the molding of the solid fuel should most preferably be in the form of fine particles (spheres), rods or rectangular powders having a maximum length of not larger than about 5000 micrometers, preferably not larger than 2000 micrometers, and most preferably from 1 to 1500 micrometers.

A pitch-like substance, which is another component of the combustible, thermally-fusible substances, used in the practice of the invention should be a solid matter at a temperature not higher than 40° C. and can be divided into a powder. When heated, the substance should be melted. Such a substance is, for example, a coal pitch. Alternatively, still residues obtained from distillation processes of various organic compounds, e.g. a vanillin still residue, may be mentioned as a pitch-like substance.

The use of a finer plastic powder makes it easier to uniformly mix with combustion ashes, resulting in better fluidity or moldability in the compression molding of the uniform mixture and also in higher strength, such as crushing strength, of the resulting compression moldings.

When the plastics in the solid fuel are initially combusted within a short ignition time for gasification, the resultant solid fuel becomes porous, permitting oxygen to be passed into the inside of the solid fuel. Thus, the plastic contributes to impart the susceptibility to combustion of the solid fuel.

The low calory powder used in the solid fuel of the invention contains from 5 to 95 wt % of an inorganic component and from 95 to 10 wt % of a carbon component.

We can give as the inorganic component, for instance, an inorganic compound contained in the fuels (coal, petroleum, products those of etc.) or produced by the combustion on them. And, we can give as the carbon component, for instance, a combustible organic component, a hydrocarbon component in the fuels, an organic component such as a hydrocarbon component produced by the combustion on the fuels or unburnt carbon etc.

The fuel combustion ash which are an inorganic component-containing low calory powder used in the solid fuel of the invention, is for preferable example, a carbon-high-containing ash comprising:

(i) inorganic components in amounts of from 5 to 25 wt %; and (ii) carbon components (combustible organic components, hydrocarbon components or unburnt carbon) in amounts of 95 to 50 wt %.

In the practice of the invention, the fuel combustion ashes can suppress a combustion rate of plastics contained in the solid fuel, can prevent the plastics from flowing when the plastics are combusted after melting, and have the function of keeping the shape of the solid fuel. The fuel combustion ashes should preferably have such a composition as mentioned above and include, for example, fuel combustion ashes obtained by combustion of oil coke or heavy oil and having an unburnt carbon component of about 60 to 95 wt %.

The inorganic components contained in the fuel combustion ashes are uniformly mixed with plastics and compression-molded to provide a solid fuel, so that they are uniformly dispersed in the solid fuel. The inorganic components can impart the following properties or capabilities to the solid fuel of the invention:

(a) capability of suppressing the combustion rate of the solid fuel to an appropriate extent;

(b) capability of suppressing the calorific value of the solid fuel at the time of combustion;

(c) property of improving the strength of the solid fuel; and (d) capability of keeping the solid fuel in shape when the solid fuel is being burnt. These are prominents features of the present invention.

The inorganic components are, for example, silicon components such as $SiO_2$, aluminium components such as $Al_2O_3$, calcium components such as $CaO$, $CaCO_3$ and the like, iron components such as $Fe_2O_3$, and other inorganic metal compounds such as $MgO$, $TiO$, $V_2O_5$, $Na_2O$, $K_2O$ and the like.

The fuel combustion ashes used to mold the solid fuel of the invention should preferably a calorific value of from 4000 to 8000 Kcal/kg, preferably from 5000 to 7000 Kcal/kg, within which the calorific value of the plastics in the solid fuel can be suitably suppressed.

The fuel combustion ashes used to mold the solid fuel should preferably have an average size of from 0.1 to 1000 micrometers, preferably from 0.5 to 500 micrometers in order to ensure uniform mixing with plastics.

The solid fuel has preferably a ratio of the fusible material to the fuel combustion ash of 0.1 to 2.0 g/g, preferably from 0.2 to 0.5 g/g in view of the strength, calorific value and combustion rate of the resulting solid fuel obtained as a compression molding.

In accordance with the invention, the content of the inorganic components in the solid fuel is most preferably in the range of from about 5 to 20 wt %.

The solid fuel may comprise, aside from the fusible material and the fuel combustion ashes, at least one of (a) water (b) plant organic components (plant fiber components) such as residue of squeezed fruits, (c) an oil component such as deteriorated waste lubricating oils, waste oils and the like, in amounts of not larger than about 55 wt %, preferably not larger than 50 wt %.

More particularly, the solid fuel appropriately contains the above additive components in the following amounts:

(A) a content of water of not larger than 20 wt %, preferably not larger than 15 wt %;

(B) a content of the plant organic component of not larger than about 50 wt %, preferably not larger than 45 wt %; and (C) a content of the oil component of not larger than 30 wt %, preferably not larger than 25 wt %.

Preferably, the solid fuel of the invention has a calorific value of from 5000 to 9000 Kcal/kg, more preferably from 5500 to 7500 Kcal/kg. In addition, the combustion time of the solid fuel at 900° C. (when tested under conditions where cylindrical pellets having a diameter of 5 mm and a length of 5 mm were used as a sample and were combusted in an electric furnace) is preferably within a range of from 100 to 500 seconds, more preferably from 200 to 500 seconds.

The coal powder (containing combustion powder of coal), which is an inorganic component-containing carbonaceous powder used in the solid fuel, is "a low calory powder of a low calorific value" which comprises:

(i) from 30 to 90 wt %, preferably from 40 to 85 wt % and most preferably from 45 to 80 wt % of inorganic components; and (ii) from 60 to 10 wt %, preferably from 60 to 15 wt % and most preferably from 55 to 20 wt %, of carbon components (including combustible organic components, hydrocarbon components or unburnt carbon).

The coal powder, as a low calory powder, should have the function of suppressing the combustion rate of the plastics contained in the solid preventing the plastics from flowing upon melting at the time of combustion, and keeping the shape of the solid fuel as it is. The coal powder having the composition as mentioned above may be, for example, debris (dirts), low quality coal powder and "coal combustion ash" obtained by combusting coal such as in fluidized combustion furnaces, containing from about 10 to 60 wt % of unburnt carbon components.

The inorganic components contained in the coal powder may be substantially the same as those described with respect to the afore-described combustion ashes.

In the practice of the invention, the coal powder used for shaping the solid fuel should preferably have a calorific value of from 1000 to 4000 Kcal/kg, preferably from 1500 to 3500 Kcal/kg, in order to suppress the calorific value of the plastics in the solid fuel.

The coal powder should preferably have an average size of from 0.1 to 1000 micrometers, preferably from 0.5 to 500 micrometers so as to permit uniform mixing with plastics.

In view of the strength, calorific value and combustion rate of the solid fuel, the ratio of the fusible material and the coal powder (for example, plastics/coal powder) should preferably be in the range of 0.2 to 2.0 g/g, more preferably from 0.3 to 1.5 g/g. The content of the inorganic components in the solid fuel should preferably be from about 5 to 35 wt %, more preferably from 10 to 30 wt %.

The solid fuel may comprise, aside from the fusible material and the coal powder, at least one of (a) water (b) plant organic components (plant fiber components) such as residue of squeezed fruits, (c) an oil component such as deteriorated waste lubricating oils, waste oils and the like, (d) oil coke, and (e) high-quality coal, in amounts of not larger than about 55 wt %, preferably not larger than 50 wt %.

In this case, the solid fuel appropriately contains:

(A) water in an amount of not larger than 20 wt %, preferably not larger than 15 wt %;

(B) the plant organic components in an amount of not larger than about 50 wt %, preferably not larger than 45 wt %;

(C) the oil component in an amount of not larger than 30 wt %, preferably not larger than 25 wt %; and (D) the oil coke or high-quality coal in an amount of not larger than about 55 wt %, preferably not larger than 50 wt %.

The solid fuel of the invention has a calorific value of from 5000 to 8000 Kcal/kg, preferably from 5500 to 7500 Kcal, and the combustion time of the solid fuel at 700° C. (in which cylindrical pellets having a diameter of 5 mm and a length of 5 mm are used and combusted in an electric furnace) is from 60 to 700 seconds, preferably from 80 to 500 seconds.

For the fabrication of the solid fuel, for example, a powder of plastics used as a thermally fusible substance and coal combustion ashes used as an inorganic component-containing low calory powder are mixed, if necessary, along with water or a waste oil, and subjected to continuous compression extrusion by the use of a biaxial extrusion molding machine, a monoaxial extrusion molding machine or a bricket machine, thereby obtaining a compression molding of a fine rod form. The fine rod compression molding is then continuously cut into pieces with a suitable length to obtain a solid fuel in the form of cylinders (including columnar cylinder, a square cylinder and the like), spheres, spheroids, pellets and the like.

The compression molding may be carried out within a temperature range of room temperature to nearly a softening temperature of the fusible material used, e.g. the temperature is generally from about 5° to 250° C., preferably from 10° to 200° C., and more preferably from 15° to 150° C. The temperature at the time of the extrusion molding for the compression moldings initially starts from room temperature (10° to 30° C.) and gradually increases by generation of heat during the compression molding operations to about 50° C. or over and particularly, to 60° to 100° C.

The thus obtained compression moldings are preferably in the form of pellets, such as columnar or square cylinders, having a diameter of from 2 to 50 mm, preferably from 3 to 40 mm and a length of from 2 to 50 mm, preferably from 3 to 40 mm, or in the form of granules, spheres and spheroids having a major diameter of from 2 to 50 mm, preferably from 3 to 40 mm. The compression moldings should preferably having a crushing strength (when using cylindrical pellets having a diameter of 5 mm and a length of 5 mm) not less than 1.5 kg, preferably from 2.0 to 50 kg.

In the compression molding process, when large amounts of water are added to a formulation of the fusible material and combustion ashes, the water should be used mainly as an auxiliary agent for wet molding. In the extruded compression moldings, the water content should preferably be not larger than about 15 wt %, preferably not larger than 10 wt %.

When plant organic components (plant fiber components) are used by addition to the formation of the fusible material and combustion ashes in the compression molding process, they serve as a kind of lubricant at the time of the compression molding, with the result that mechanical energy for the compression molding can be saved. When the solid fuel containing plant fiber components is combusted, the plant fiber components can contribute to prevent the plastic for melting and flowing and are consumed as part of the fuel.

Examples of the plant organic components are residue of squeezed various fruits and food materials, e.g. squeezed mandarin oranges, coffee grounds, wheat lees for beer, and squeezed sugar beets, squeezed millets, squeezed soybeans for soy sauce, and squeezed sugars for low class distilled spirits.

The oil components may be waste oils discharged from machine shops such as waste lubricants, cutting oils and the like, and waste solvents from chemical plants such as toluene, styrene, phenol and the like.

The oil coke may be petroleum cokes which are obtained by calcining a solid residue (raw petroleum coke) remaining after cracking of heavy residues produced during purification of petroleum and collection of light fractions, and petroleum coke, or a raw petroleum coke thereby removing volatile matters to increase a solid carbon content, or sintered petroleum cokes. The high quality coal is intended to means ordinary coal or smokeless coal in which the content of inorganic components is less than 30 wt %.

The present invention is more particularly described by way of examples.

[EXAMPLES 1-7]

Formulations of solid fuels according to the invention using various starting materials are indicated in Table 1 in which amounts are expressed by parts by weight.

In these formulation ratios, waste plastics are a powder of an incompletely polymerized ABS resin having an average size of 1000 micrometers (calorific value: 10000 Kcal/kg, fusible point: 150° C.), polyethylene (calorific value: 9400 Kcal/kg, fusible point: 150° C.), polypropylene (calorific value: 9500 Kcal/kg, fusible point: 165° C.) and a powder of a vanillin still residue having an average size of about 1000 micrometers (calorific value: 6100 Kcal/kg, fusible point: 85° C.).

The combustion ash of oil coke contains about 10 wt % of inorganic substances [$SiO_2$: 1.7 wt %, $V_2O_5$: 5.3 wt %, others ($Fe_2O_3$, $Al_2O_3$, $MgO$, $TiO$, $K_2O$, $SO_3$, etc.): each 0.01–2.2 wt %], with the balance of carbon components (unburnt carbon). The calorific value is 7500 Kcal/kg. The heavy oil combustion ash contain about 15% of inorganic substances [$Fe_2O_3$: 3.1 wt %, $V_2O_5$: 4.3 wt %, others ($SiO_2$, $Al_2O_3$, $CaO$, $MgO$, $P_2O_5$, $Na_2O$, $NiO$ and the like): each 0.02–0.08 wt %], with the balance of carbon components (unburnt carbon). The calorific value is 5500 Kcal/kg.

The squeezed mandarin oranges contain about 756 wt % of water and have a calorific value of 4502 Kcal/kg when dried. The calorific value of the waste oil is 8600 Kcal/kg.

TABLE 1

| | | | |
|---|---|---|---|
| Formulation I | Incompletely polymerized ABS resin | Oil coke combustion ash | Water |
| | 0.3 | 1.0 | 0.1 |
| Formulation II | PE | Oil coke combustion ash | Water |
| | 0.3 | 1.0 | 0.1 |
| Formulation III | PP | Oil coke combustion ash | Water |
| | 0.3 | 1.0 | 0.1 |
| Formulation IV | Vanillin still residue | Oil coke combustion ash | Water |
| | 0.3 | 1.0 | 0.1 |

TABLE 1-continued

| Formulation V | Vanillin still residue | Oil coke combustion ash | Water |
|---|---|---|---|
| | 0.3 | 1.0 | 0.1 |
| Formulation VI | Vanillin still residue | Oil coke combustion ash | Squeezed mandarin orange |
| | 0.5 | 1.0 | 1.0 |
| Formulation VII | Incompletely polymerized ABS resin | Heavy oil combustion ash | Water |
| | 0.3 | 1.0 | 0.1 |

EXAMPLE 1

The respective starting materials of Formulation I were charge into a mixer, and the resulting mixture was extruded through a biaxial compression (extrusion) molding machine (110 kg/hr, power supply 7.5 KW) at a temperature of 70° C., followed by continuous cutting of the resulting extruded product and cooling to obtain a solid fuel in the form of cylindrical pellets having a diameter of 5 mm and a length of 5 mm (compression moldings, water content of about 5 wt %).

The cylindrical pellets were subjected to a combustion test in which they were combusted in an electric furnace, revealing that ignition at 900° C. was within 1 second and that the cylindrical pellets did not simply break during combustion. In addition, deposition of the cylindrical pellets on the walls of the electric furnace by melting of the plastic, or deformation of the pellets by melt flow was not found, and the combustion state and efficiency (unburnt carbon components: 2.5 wt %) were good. The results of the combustion test are shown in Table 2.

The cylindrical pellets could be well combusted in a fluidized bed boiler.

The other properties of the cylindrical pellets are shown in Table 2.

COMPARATIVE EXAMPLE 1

For comparison, a combustion test using an ABS resin for combustion in an electric furnace was effected, revealing that the ABS resin immediately melted and was burnt up in about 35 seconds.

COMPARATIVE EXAMPLE 2

For comparison, a combustion test using an oil coke for combustion in an electric furnace was effected, revealing that the oil coke had a long surface combustion time and was burnt up in about 550 seconds.

EXAMPLES 2–7

The starting materials of Formulations II to VII were, respectively, used to form solid fuels in the form of pellets (compression moldings) in the same manner as in Example 1.

The properties of the cylindrical pellets of the respective examples are shown in Table 2.

The respective pellets (solid fuels) obtained in Examples 4 to 7 were subjected to a combustion test at 900° C., with the result that the ignition time was within about 1 second in all the cases, and could be combusted substantially in the same combustion state as the pellets obtained in Example 1.

As for the pellets (solid fuels) obtained in Examples 1 to 7 and the pellets of the ABS resin obtained in Comparative Example 1, the content of the combustion time in the combustion test at 900° C. is shown in FIG. 1 and Table 2 in more detail.

TABLE 2

| Example | Crushing Strength (kg) Extruding Direction | Crushing Strength (kg) Right-angled Direction | Heat Value Kcal/kg | Combustion Time seconds |
|---|---|---|---|---|
| 1 | 3.0 | 2.9 | 7800 | 483 |
| 2 | 2.8 | 2.7 | 7400 | 452 |
| 3 | 2.6 | 2.5 | 7400 | 463 |
| 4 | 5.0 | 4.8 | 6900 | 441 |
| 5 | 4.5 | 4.2 | 7400 | 415 |
| 6 | 2.2 | 2.0 | 5700 | 225 |
| 7 | 3.5 | 3.3 | 6300 | 491 |

[EXAMPLES 8 to 13]

Formulations of starting materials used in examples in which coal ashes are used in solid fuels of the invention are shown in Table 3 in which amounts are expressed by parts by weight.

In the formulations, the waste plastics used are an ABS resin powder having an average size of about 80 micrometers (calorific value: 10000 Kcal/kg), a nylon-6 powder have a maximum length of 500 micrometers (calorific value: 7300 Kcal/kg), and a polypropylene powder having a maximum length of approximately 500 micrometers (calorific value: 9500 Kcal/kg).

The coal ash contains about 70 wt % of inorganic substances [$SiO_2$: 30.9 wt %, $Al_2O_3$: 19.8 wt %, and others ($Fe_2O_3$, CaO, MgO, TiO, $K_2O$ and the like): each 0.5 to 3 wt %], with the balance of carbon components (unburnt carbon). The calorific value is 2500 Kcal/kg.

The squeezed mandarin oranges have about 76 wt % of water and a calorific value of 4502 Kcal/kg in a dry state. The calorific value of the waste oil is 8600 Kcal/kg.

TABLE 3

| Formulation VIII | ABS resin | Coal ash | Water | | |
|---|---|---|---|---|---|
| | 1.2 | 0.8 | 1 | | |
| Formulation IX | ABS resin | Coal ash | Squeezed mandarin orange | | |
| | 1.2 | 0.8 | 1 | | |
| Formulation X | ABS resin | Coal ash | Waste oil | | |
| | 1 | 1 | 0.5 | | |
| Formulation XI | ABS resin | Coal ash | Waste oil | Oil coke |
| | 1 | 2 | 0.5 | 3 |
| Formulation XII | Nylon-6 | Coal ash | | | |
| | 1 | 1 | | | |
| Formulation XIII | Poly-propylene | Coal ash | | | |
| | 1 | 1 | | | |

EXAMPLE 8

The starting materials of Formulation VIII were charged into a mixer and mixed, and the resultant mixture was extruded, while dehydrating and compressing, in a biaxial compression (extrusion) molding machine (30 kg/hr, power 0.5 kW) at a temperature of 70° C. The extruded molded product was continuously cut into pieces and cooled to obtain a solid fuel in the form of cylindrical pellets (compression moldings with a water content of about 5 wt %) having a diameter of 5 mm and a length of 5 mm.

The cylindrical pellets were subjected to a combustion test for combustion in an electric furnace, revealing that ignition of 700° C. was as fast as within 14 seconds.

The cylindrical pellets did not readily break during the combustion, and deposition by melting of the plastic in the pellets on the walls of the electric furnace or flow deformation of the pellets did not occur. The combustion state and efficiently (unburnt carbon components: 2.5 wt %) were good. The results of the combustion test are shown in FIG. 3 and Table 4.

The cylindrical pellets could be well combusted in a fluidized bed boiler.

The other properties of the pellets are shown in Table 4.

COMPARATIVE EXAMPLE 3

For comparison, an ABS resin was used for a combustion test in an electric furnace, revealing that the resin immediately melted and was burnt up in about 50 seconds.

EXAMPLE 9

The general procedure of Example 8 was repeated except that the starting materials of Formulation IX was used, thereby obtaining a solid fuel as compression moldings (cylindrical pellets having a moisture content of about 4.5 wt %).

The cylindrical pellets were in the same combustion state as those obtained in Example 8.

The properties of the pellets are shown in FIG. 3 and Table 4.

EXAMPLE 10

The general procedure of Example 8 was repeated except that the starting materials of Formulation X were used, thereby obtaining a solid fuel of compression moldings (cylindrical pellets).

The properties of the pellets are shown in Table 4.

EXAMPLE 11

The general procedure of Example 8 was repeated except that the starting materials of Formulation XI (in which the oil coke a raw petroleum coke in the form of a powder having a size of about 500 micrometers with a calorific value of 8700 Kcal/kg), thereby obtaining a solid fuel of compression moldings (cylindrical pellets).

EXAMPLES 12-13

The respective starting materials of Formulations XII and XIII were used and compression molding in the same manner as in Example 8 to obtain a solid fuel in the form of pellets (compression moldings).

The properties of the cylindrical pellets are shown in Table 4.

The respective pellets (solid fuels) obtained in Examples 9 to 13 were subjected to a combustion test at 700° C., revealing that an ignition time was within about 15 seconds in all the cases. In addition, the pellets could be combusted substantially in the same state as the pellets (solid fuel) obtained in Example 8.

As for the pellets obtained in Examples 8 to 10 and 12 to 13 and the ABS resin pellets obtained in Comparative Example 3, the content of the combustion time in the combustion test at 700° C. is illustrated in FIG. 3 in detail.

The pellets (solid fuel) obtained in Example 11 were combusted at 900° C. The content of the combustion time is shown in FIG. 3.

TABLE 4

| Example | Crushing Strength (kg) Extruding Direction | Crushing Strength (kg) Right-angled Direction | Calorific Value Kcal/kg | Combustion Time seconds |
|---|---|---|---|---|
| 8 | 9.7 | 12.1 | 6000 | 124 |
| 9 | 2.2 | 2.0 | 6050 | 105 |
| 10 | 43.5 | 33.5 | 5500 | 145 |
| 11 | over 35 | over 35 | 7000 | 345 |
| 12 | over 35 | over 35 | 5200 | 98 |
| 13 | over 30 | over 30 | 6000 | 102 |

This invention relates to a solid fuel in which waste plastics, waste oils and the like, which have generally high combustion rates with great calorific values, so that they can rarely be used as fuels, can be re-utilized as a solid fuel for use in fluidized bed boilers. Thus, the invention is very effective as an energy-saving technique.

The solid fuels of the invention have the following features:

(i) sufficient strength for combustion in fluidized bed boilers;

(ii) a controlled or relatively slow combustion rate of plastics:

(iii) little or no damages of a combustion furnace involved by too high a temperature by combustion because the calorific value is suppressed; and (vi) no deposition of a melt of plastics in the solid fuel on furnace walls or no flow of the solid fuel by melting because of the use of inorganic componentcontaining low calory powders, ensuring a very good combustion state.

What is claimed is:

1. A solid fuel consisting of compression moldings of a combustible, thermally fusible material selected from the group consisting of a thermoplastic resin or pitch; and a fuel combustion ash obtained by combustion of an oil coke, heavy oil or coal as a low calorie powder, the ratio of said combustible thermally fusible material to said low calorie powder being in the range of 0.1~2.0 g/g.

2. A solid fuel according to claim 1, wherein said fuel combustion ash has a calorific value of from 4000 to 8000 Kcal/kg.

3. A solid fuel according to claim 1, wherein the solid fuel has a calorific value of from 5000 to 9000 Kcal/kg and a combustion time at 900° C. of from 100 to 500 seconds.

4. A solid fuel according to claim 1, wherein said coal powder has a calorific value of from 1000 to 4000 Kcal/kg.

5. A solid fuel according to claim 1, wherein said coal powder is a coal combustion ash obtained by combustion of coal.

6. A solid fuel according to claim 1, wherein the solid fuel has a calorific value of from 5000 to 8000 Kcal/kg and a combustion time at 700° C. of from 60 to 500 seconds.

* * * * *